Oct. 27, 1964
L. O. STINE ETAL
3,154,395
CONTINUOUS FRACTIONAL CRYSTALLIZATION PROCESS
Filed Jan. 30, 1961
2 Sheets-Sheet 2
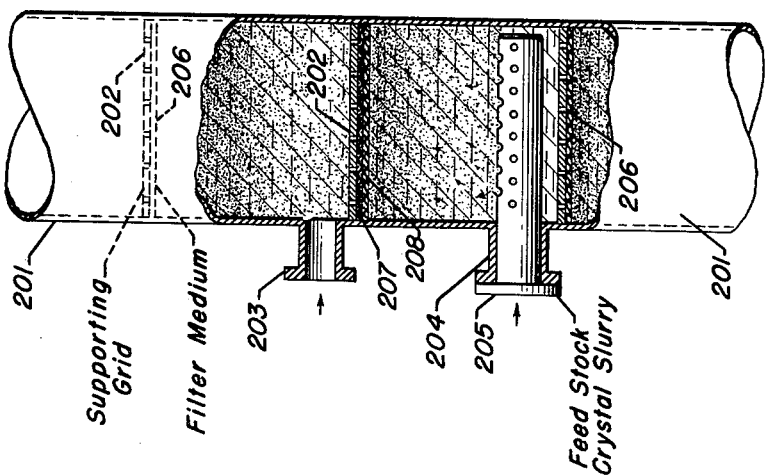
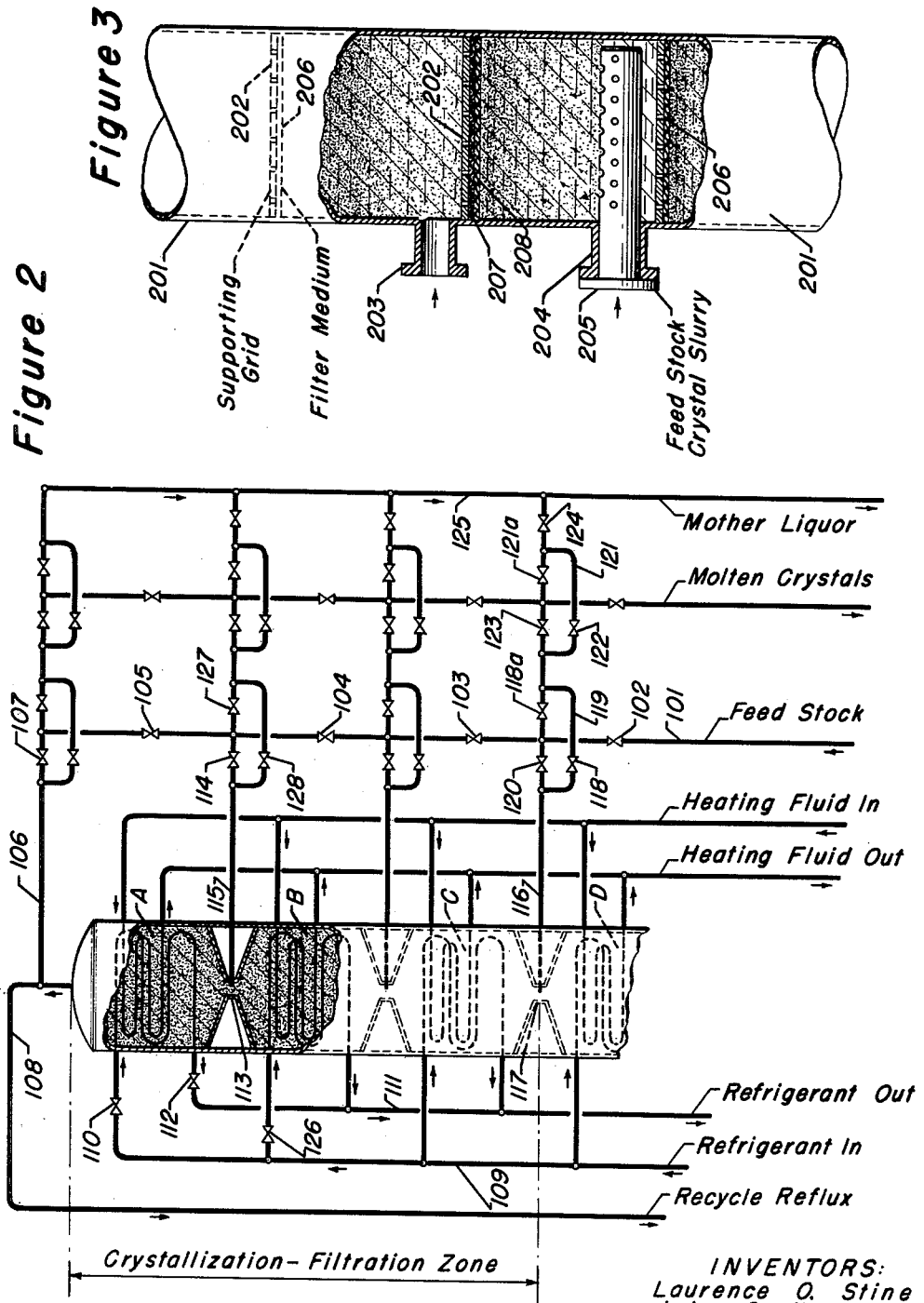
INVENTORS:
Laurence O. Stine
John G. Wenner
Dennis J. Ward
BY: Chester J. Giuliani
Donald E. Mochling
ATTORNEYS though the recovery of purified, ion-free water from a source of brackish water, such as sea water. Another object of the process, indicative of

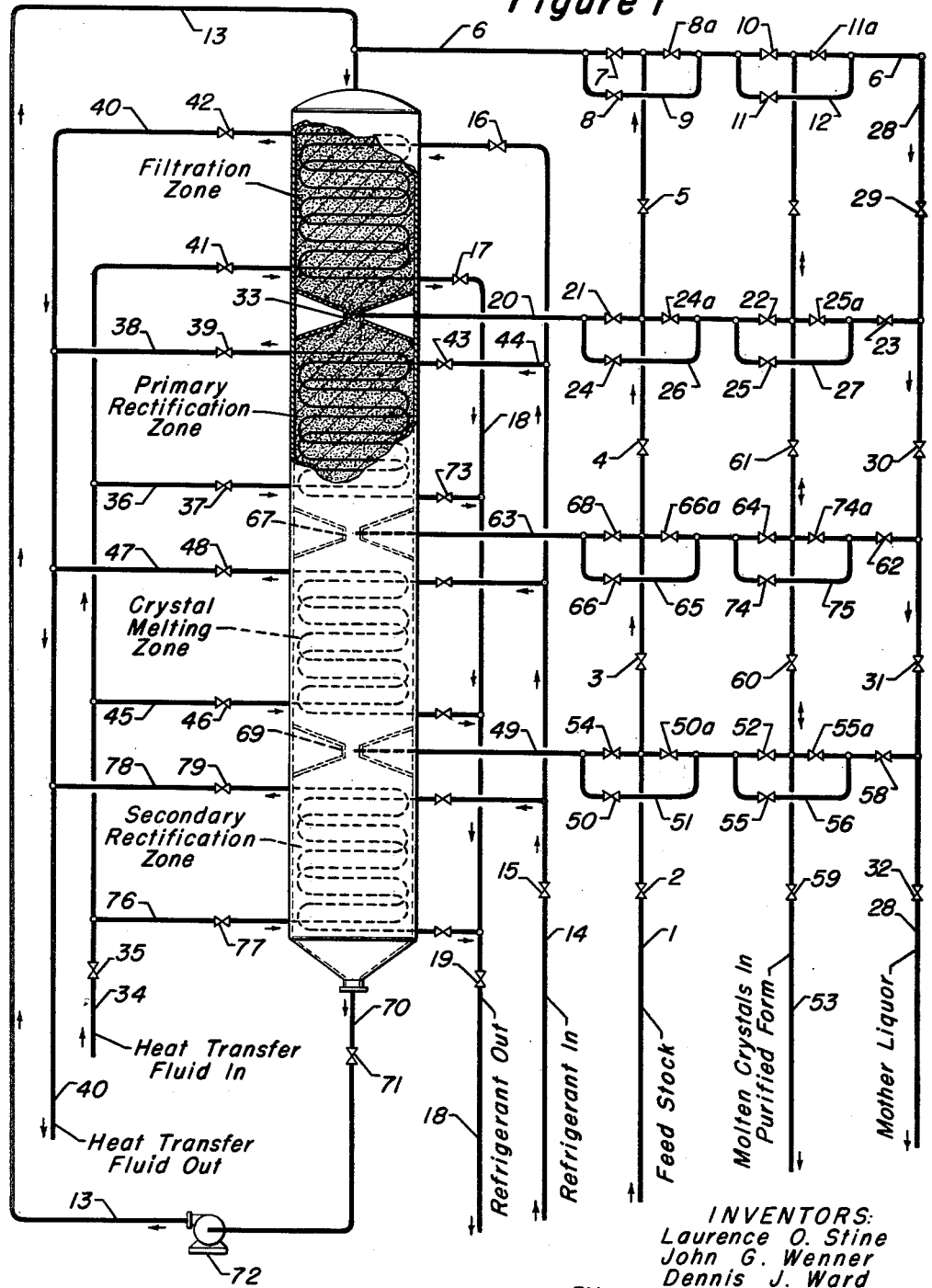

United States Patent Office 3,154,395
Patented Oct. 27, 1964

3,154,395
CONTINUOUS FRACTIONAL CRYSTALLIZATION PROCESS
Laurence O. Stine, Western Springs, John G. Wenner, Mount Prospect, and Dennis J. Ward, Lombard, Ill., assignors to Universal Oil Products Company, Des Plaines, Ill., a corporation of Delaware
Filed Jan. 30, 1961, Ser. No. 85,717
10 Claims. (Cl. 62—58)

This invention relates to a process for the separation of a mixture of compounds, at least one of the components of which is capable of being crystallized from the mixture at a relatively reduced temperature, and at least one other component of which remains in the liquid phase at the relatively reduced temperature. More specifically, this invention relates to a process for purifying a crystallizable component of a mixture of compounds in solution on a continuous, cyclic basis, using multiple, serially interconnected filtering zones and a programmed system of shifting the feed and product inlets and outlets to and from the zones, wherein the zone from which the product streams are withdrawn are refluxed with a stream of the same composition as the product stream to be withdrawn from the zone, just prior to the shift of the feed inlets and product outlets to and from the zone.

In most crystallization processes for the recovery of a crystalline product from a mixture of compounds, the process of crystallization must be conducted on a batch-scale basis and the crystalline product must be repeatedly recrystallized from the eutectic mixture by remelting or redissolving the crystals obtained in a prior separation step, the recrystallization being repeated until the residue of eutectic mixture remaining on the crystal surfaces after removal of the solvent and the amount of impurities co-crystallized with the desired product are reduced to a negligible level. On a batch-scale basis, the purification of the product is obviously cumbersome and time-consuming and the process involves numerous items of equipment to transfer and store the various solutions of different concentrations from which the end products are to be recovered. The process is also usually encumbered by the necessity of washing the recovered crystals from a given separation step with a reflux of more purified material in order to remove the mother liquor entrained between the individual particles of crystals, thereby necessitating the recycle of large quantities of wash streams to auxiliary recovery stages which become ancillary to the main process flow. Utilizing the flow arrangement provided in the process of the present invention, on the other hand, a continuous process is presented for separating the crystallizable component from a mixture of compounds wherein all of the wash streams are internally integrated into the main process flow and merely one unitary piece of equipment to recover the desired end product, is all that is required to yield a product of substantially 100 percent purity.

One object of this invention is to provide a continuous process for recovering a substantially pure crystallizable component from a mixture of compounds. Another object of this invention is to provide an economically operated process for recovering one of the components of a mixture of compounds employing a direct, once-through flow arrangement of feed streams and wherein the separation is effected with a minimum of equipment and apparatus.

In one of its embodiments this invention relates to a process for separating a crystallizable component in substantially pure form from a mixture of compounds which comprises continuously separating crystals of said crystallizable component from said mixture in the filtration zone of a process flow comprising at least four, serially interconnected zones, each zone of which successively functions as a filtration zone during a complete cycle of operation, the outlet of the last zone in the series being connected by fluid-flow connecting means to the inlet of the first zone in the series to thereby provide continuous cyclic flow through all of the zones in series, including a primary rectification zone downstream from said filtration zone, a crystal-melting zone downstream from the primary rectification zone and a secondary rectification zone downstream from said melting zone, cooling said solution of said mixture of compounds to a temperature at which crystallization of said crystallizable component of the solution occurs and forms a slurry comprising discrete crystalline particles of said component, filtering the slurry in said filtration zone to thereby form a bed of crystals on the filter medium in said filtration zone, continuously withdrawing mother liquor from the fluid outlet of said filtration zone, continuously flowing a portion of the stream of mother liquor into the inlet of the serially downstream primary rectification zone to thereby displace the liquid occupying said zone with mother liquor, introducing heat into said crystal melting zone, withdrawing molten crystals from the fluid outlet of said crystal melting zone, continuously charging at least a portion, but less than all, of the molten crystals into the inlet of the crystal melting zone, and at least another portion into the inlet of the serially downstream secondary rectification zone, continuously withdrawing liquid from the outlet of the secondary rectification zone and charging the thus withdrawn effluent into the inlet of the first zone in the series, said process being further characterized in that the flow of said mixture of compounds into the filtration zone is discontinued when said zone attains its capacity of crystals, and thereafter shifting all inlets and outlets into and from said zones an equal, downstream increment of the series of zones.

Other objects and embodiments of this invention will be referred to in greater detail in the following further description of the invention.

The process of this invention is further described by reference to the accompanying diagrams, FIGURE 1 of which is a flow diagram of the present process, illustrating the method with respect to an apparatus in which the serially interconnected zones contain granular solid particles as the filter medium and the minimum number of four zones is illustrated for the sake of simplicity. FIGURE 2 illustrates a particularly preferred alternative arrangement of the apparatus of FIGURE 1 in which one of the zones (here illustrating the filtration zone, corresponding to the filtration zone of FIGURE 1) is subdivided into three individual beds, each with inlets and outlets associated therewith. FIGURE 3 illustrates the use of a porous filter plate as the filter medium in place of the bed of solid particles as the filter medium of FIGURES 1 and 2 and illustrates up-flow of the fluid stream involved in the process cycle. The filtration zone which coincidentally is the uppermost zone in the series is depicted here for exemplary purposes only, any one of the other four functional zones in the process flow also being available for illustrative purposes.

The process of this invention is amenable to the use of a wide variety of feed stocks and to a wide variety of process conditions, provided that the component to be separated from the mixture of compounds or solution is a crystallizable substance capable of being dissolved in a liquid solvent. The particular process flow and the method of treating such solutions or mixtures as feed stocks is the critical and essential concept of this invention. Thus, the object of the process may be the recovery of purified, ion-free water from a source of brackish water, such as sea water. Another object of the process, indicative of another type of feed stock utilizable herein, is the separation of one of the xylene isomers, such as para-xylene from a mixture of $C_8$ aromatic hydrocarbons containing other xylene isomers. Still other uses of the present process include: the separation of purified naphthalene from a mixture of aromatic hydrocarbons; dewaxing of lubricating oils with or without light hydrocarbon solvents such as propane; the recovery of a jet fuel fraction comprising the normal paraffin components of a hydrocarbon mixture, such as mixtures boiling in the gasoline or kerosene boiling range; and other liquid feed stocks containing a crystallizable compound in solution in a liquid solvent. The process may also be adapted to the crystallization-separation of a mixture of compounds which precipitate a crystalline adduct of one of the components upon the addition of an adduct-forming reagent to the mixture and the reduction in the temperature of the resulting mixture. Thus, normal paraffins form a crystalline adduct when urea is added to a mixture of normal and iso or cyclic hydrocarbons, thiourea forms a crystalline adduct with cyclic hydrocarbons at temperatures of from 0° to about 25° C., and water forms a crystalline adduct of the light n-paraffins, such as n-butane at selected conditions, providing a means of recovering pure water from sea water, for example.

The solvent itself may be the desired end product of the process, as for example, in the recovery of substantially pure water from a saline solution, such as sea water. In the latter separation, the compound to be recovered from the salt solution is pure water which crystallizes from the saline solution at temperatures below the freezing point of pure water, the mother liquor consisting of a more highly concentrated waste solution of salt.

Referring to FIGURE 1 of the accompanying diagrams, a feed stock consisting of a fluid solution of compounds, at least one component of which is capable of being crystallized from the solution at a temperature relatively lower than the feed solution, such as a saturated solution of a water-soluble salt which remains in homogeneous solution at a temperature at which the feed stock is supplied to the process, but which precipitates as a crystallized salt when the temperature of the solution is lowered, is fed into the process flow, either in an at least partially crystallized form (i.e., cooled to a temperature at which crystallization has commenced, that is, as a slurry), or as a homogeneous solution, at a temperature of incipient crystallization. One form of the apparatus provided in the simplified form of the present process consists of a cylindrical housing containing four distinct zones marked by at least one porous bed of solid particles per zone through which the liquid portion of the feed stock readily flows, but in which the solid, crystalline particles which separate upon cooling the feed stock solution are retained, as the liquid portion filters through the mass of particles in the bed and continues in a downstream direction of flow. Other types of filter medium utilizable herein are hereinafter described and characterized more fully.

For purposes of convenience of description, the first bed in the series at the top of the column illustrated in FIGURE 1 is taken as the point of beginning for the present separation process and constitutes the first filtration zone in the particular series shown in which the feed stream enters the top bed in the column. Although upward flow or downward flow may be utilized in carrying out the process of separation provided by this invention, the description of FIGURE 1 of the present diagram is based upon the flow of fluid being downward through the porous mass of solid particles comprising the filtration bed is aided by the effect of gravity and is therefore preferred for this process, although it is to be emphasized that an upward flow of fluid is also utilizable herein by forcing the fluid upwardly through the bed of solid particles with the aid of a pump.

When utilizing the uppermost bed in the series as the point of entry of feed stock, this bed thereby constitutes the filtration zone of the process, the bed subadjacent to the filtration zone, being the next first downstream bed in the series, constitutes the primary rectification zone, wherein purification of the mother liquor stream occurs, as hereinafter described. The third downstream bed in the series subadjacent to the primary rectification zone constitutes a crystal melting zone wherein the crystals separated in a previous cycle of operation are melted and are removed from the bed of solid particles. The fourth and last downstream bed in the series comprising the arrangment of the present process constitutes a secondary rectification zone wherein purification of the crystalline product is effected, as hereinafter described.

In accordance with the basic flow pattern provided by the process of this invention, the fluid leaving the outlet of the last bed in the series of adjacent, serially connected beds is pumped from the outlet of the last bed (which in the instance described herein, wherein the feed stock enters the top of the uppermost bed of the series and leaves via the outlet from the secondary rectification zone, which at this stage of the process is the lowermost bed in the series) through a conduit connected to the bottom of the column and is lifted at a substantially higher pressure by means of a pump to the top of the column where it enters the top of the first bed in the series of adjacent zones. Each bed in the series may contain two sets of coils, through one of which a refrigerant is circulated to cool the incoming stream of fluid flowing into the top of the bed and a second, individual set of coils through which a heat transfer fluid may be circulated at the appropriate time for the purpose of melting the filtered crystals deposited in the porous bed of solid particles during a previous cycle of operation, each bed being separately supplied with refrigerant or heating fluid, depending upon the particular stage of the process cycle for which the bed is being used. A single coil may be provided to carry both refrigerant and heating fluid, particularly when a fluid of the same composition is used as both refrigerant and heating fluid and merely the temperature of the fluid is adjusted to serve the particular purpose. Although both the refrigerant fluid and the heat transfer fluid may flow in either direction through their respective coils, for operational reasons when the refrigerant is a fluid which cools by transfer of sensible heat only, and when the flow of fluid through the zones is in a downward direction, as illustrated, it is preferred that the refrigerant stream flows through the cooling coil beginning at the bottom of the zone and thereafter flowing upwardly through the zone, out of the top of the zone into a refrigeration unit where the heat picked up from the fluid stream is extracted prior to recycle of the refrigerant. Thus, the flow of feed stock is countercurrent to the direction of refrigerant flow. Also for operational reasons, when the refrigerant is a fluid which cools by evaporation of the liquid refrigerant (e.g., n-butane, Freon, liquid ammonia, or other volatile liquids), the refrigerant is admitted at the inlet end of the zone and co-current flow of the feed stock and refrigerant is established. Utilizing the indicated cocurrent flow pattern for evaporative cooling refrigerants, liquid refrigerant contacts the warm feed stock stream in the upper end of the zone where maximum vaporization of the refrigerant may take place and cause the least disruption of the bed of solid particles and maximum pressure differential between the liquid refrigerant inlet and the vaporized refrigerant outlet. In addition, the liquid refrigerant accompanies the stream of fluid flowing through the zone as the latter is cooled, thus building up the bed of crystals from the bottom of the bed upwardly toward the top.

In the stage of the operation illustrated in the accompanying diagram, the feed stock (a solution of the crystallizable component in a liquid solvent or a precooled slurry of crystals) enters the process flow through line 1, thereafter flowing upwardly through open valves 2, 3, 4 and 5, into line 6, one of the lines comprising a suitable manifold system for directing the flow of the fluid streams herein.

The flow of fluids is directed into each bed of the series of beds comprising the apparatus for effecting the present process and is controlled by means of a manifold system of fluid conduits containing appropriate valves in each of the conduits to obtain the desired flow pattern. A system of control and direction of the various fluid streams may also be realized by the combination of fluid conduits and a central, multi-port distributing valve, such as the system shown and described in the co-pending application of Donald B. Broughton et al., Serial No. 660,-790, filed May 22, 1957, now Patent No. 2,985,589, May 23, 1961.

In the illustration depicted in FIGURE 1, representing one stage in the cyclic shift of functional zones in which the uppermost bed in the column is the filtration zone or the first zone in the adjacent series of zones, valve 7 in line 6, is maintained in an open position while valve 8 in by-pass line 9, valve 8a in line 6, are maintained in the closed position. The feed stock thereby flows from line 1 into line 6 which connects with pump-around recycle line 13, leading into the top of the filtration zone comprising the uppermost bed in the column, thereafter flowing downwardly through the stationary bed of solid particles comprising the filtration zone.

The bed of solid granular particles maintained in each of the functional zones of the separation column is sufficiently porous to permit the flow of liquid from one end of the bed to the other end without substantial resistance to the flow, the particles being composed of a substance which is substantially inert to any of the fluids within the system. Suitable materials for this purpose include sand, preferably of relatively coarse texture to provide the requisite porosity, gravel, broken glass, inert ceramic materials in general, such as broken fire brick, quartz chips, etc., any of the porous, granular, synthetic materials, such as the siliceous material known by its trade name: "Vermiculite," charcoal, and others. One of the preferred granular solids utilizable as the filtration medium in each of the beds is sand which is structurally stable and inert, preferably having a grain size of from 100 to about 2000 microns in diameter. Another preferred form of filtering medium are the spherically shaped particles of silica gel formed by gelling droplets of silica sol in an oil bath, each of the particles having a uniform size and shape and when utilized in the present separation process do not cause channelling of the fluid flowing through the bed. The methods available for preparing spherical metal oxide gel particles are well-known in the prior art, typical of such processes being disclosed and described in U.S. Patents Nos. 2,418,232 of M. M. Marisic, 2,435,379 of R. C. Archibald and 2,736,713 of M. J. Murray et al. The filtration beds utilized herein are preferably composed of particles having a size range in which the mean cross-sectional diameter of the particles is from about 50 to about 2000 microns, although other sizes larger and smaller than the indicated range are also useful in particular instances.

As previously indicated, the feed stock which may be supplied to the process as a precooled solution of the crystallizable component or as a partially crystallized slurry enters the process through line 1, connecting with line 6 which, in turn, connects with line 13 feeding into the top of the column, which in the stage of the cyclic process described herein as the point of beginning, is the filtration zone of the process cycle. As the feed stock flows into the filtration zone, it occupies the void spaces between the particles of granular solid in the filter bed and comes into contact with the cooling coil embedded in the solid particles and through which a refrigerant is circulated, thereby cooling the incoming stream of feed stock flowing into the top of the bed. For this purpose the refrigerant is introduced into line 14 at a rate controlled by valve 15, flowing upwardly through line 14 and valve 16, which controls the flow of refrigerant into the specific cooling coil embedded in the uppermost filtration zone. In the preferred method of operation the refrigerant coil extends from the top to the bottom of the bed, thereby occupying the entire flow route of the liquid feed stock. The refrigerant, after picking up the required amount of heat in the filtration zone to effect the desired degree of crystallization, is removed from the coil through line 18 and valve 17, thereafter flowing downwardly through line 18 and open valve 19 to a compressor or other means for removing heat from the refrigerant which has been extracted from the feed stock liquor in the filtration zone. As the refrigerant removes heat from the feed stock flowing downwardly through the filtration bed, the crystallizable component in solution precipitates as discrete crystals which are retained by the solid particles comprising the filter medium. The remaining mother liquor continues to flow downwardly through the bed and is cooled still further by the added length of refrigerant coil embedded in the filter bed, resulting in further crystallization and precipitation of the crystals from the mother liquor. The rate of flow of refrigerant through the coils, the length of the coil, and the length of the bed of granular solid are design factors based upon engineering calculations for each system under consideration, determining the amount of crystallization and the degree of separation of crystallizable component from the feed stock. These factors will also be dependent upon the component to be crystallized, the concentration of the crystallizable component in the feed stock liquid and other factors involved in the process.

The filtrate mother liquor from which the crystallizable component has been removed to a maximum degree by cooling in the filtration zone and super-cooled to the lowest temperature at which crystallization will occur is removed from the bottom of the filtration zone through a conduit connecting the first zone in the series of at least four zones with the downstream primary rectification zone of the process flow, which in this illustration is the next subadjacent bed in the series. A major proportion of the mother liquor is withdrawn from the separation column through line 20 connecting with conduit 33 between the filtration zone and the serially interconnected downstream primary rectification zone, being withdrawn therefrom through line 20, by-pass valves 24 and 25 and valve 23 into line 28, valves 21, 24a, 22 and 25a, being closed in order to prevent mother liquor from entering lines 1 and 53 and directing the flow into line 28, the outlet conduit for mother liquor. Valve 29 above the juncture of line 20 with line 28, is simultaneously closed and valves 30, 31 and 32 are opened to thereby withdraw the mother liquor to product storage or for discharge from the process flow. At least a portion of the mother liquor removed from the filtration zone is permitted to continue flowing as a reflux stream into the subadjacent primary rectification zone through conduit 33 connecting the outlet of the filtration zone to the inlet of the primary rectification zone, the flow rate of the mother liquor reflux being sufficient to provide a volume rate of flow corresponding to at least the volume of void spaces between the particles of solid in the filter bed occupying the primary rectification zone. The reflux stream flows into the subadjacent primary rectification zone at the same time that feed stock flows into the top of the filtration zone and as mother liquor is withdrawn from the process flow. The quantity of mother liquor thus diverted as reflux through line 33 is preferably slightly less than that required to fully wash free the material (molten crystals) retained in the void spaces between the particles of solid comprising the filter bed in the primary rectification zone when that bed was the crystal melting zone during the last previous stage of operation. The mother liquor stream introduced into the top of the next downstream primary rectification zone pushes ahead of it by displacement, the residual deposit of molten crystals and thus itself takes the place of the previous residue. In this manner, the filter bed is prepared for the reception of feed stock when the next shift in fluid inlets and outlets occurs as the next stage of the process cycle commences. In order to provide sufficient mother liquor to just replace the residual fluid from the primary rectification zone into the downstream crystal melting zone, the quantity of reflux stream (i.e., mother liquor) entering the primary rectification from the crystallization zone is controlled to provide a flow rate of from 0.5 to about 0.95 volume of reflux per volume of void spaces for the period of each stage in the cycle. By thus under-refluxing the primary rectification zone, mother liquor does not enter the crystal melting zone downstream from the primary rectification zone and the residue of molten crystals displaced by the reflux stream is not contaminated with mother liquor as it flows into the next subadjacent crystal melting zone and a line of demarcation or "front" is maintained between the displaced molten crystal phase and the liquid mother liquor phase. If heat is to be introduced into the reflux stream, which in some applications of the process may be desirable, this is accomplished by means of a heat transfer fluid circulating in the heating coil embedded within the mass of solid particles in the filter bed of the primary rectification zone. Heat transfer fluid which raises the temperature of the mother liquor flowing through the primary rectification zone is admitted into the process flow through line 34, at a flow rate controlled by valve 35, the fluid thereafter rising through conduit 34 into line 36 and through valve 37 which controls the flow of heating fluid into the heating coil embedded in the mass of solid particles maintained within the primary rectification zone as a filter bed. The heating fluid is preferably admitted into the coil at the bottom of the bed and is allowed to flow upwardly through the bed delivering heat to the fluid stream as the latter descends through the bed, the heat transfer fluid thereafter being removed from the top of the bed through line 38 and valve 39. Line 38 connects with line 40 which removes the heat-exchanged fluid from the heating coils and returns it to a heater for recycle into the process at a higher temperature. All other valves in the heat transfer fluid lines, except those hereafter specifically mentioned, are closed in order to direct the flow of heating fluid into the desired beds. Thus, valves 41 and 42 which would normally admit heating fluid into the filtration zone are specifically closed in order to maintain maximum cooling effect of the refrigerant in said zone during the stage of the operation in which filtration occurs in the top bed of the column. The removal of residual crystalline material from the primary rectification zone by displacement with mother liquor is especially desirable when the crystallizable component is an impurity in the feed stock to be removed therefrom by deposition in the filter bed, leaving a mother liquor of greater purity than the feed stock. In such an operation the filter bed is desirably swept free of the crystalline residue, leaving a filter bed occupied only by mother liquor which is the product stream to be removed from this bed in the next shift of the inlet and outlet streams into and from the column. In other instances, for example, when the crystalline deposit is the desired end product of the process, the residue of molten crystals remaining in the filter bed of the primary rectification zone are preferably maintained in as pure a condition as possible and therefore, the mother liquor reflux stream entering the primary rectification zone is kept from mixing with the molten crystals and for this purpose may be cooled as it flows into the zone, for example, by opening valve 43 in line 44, which allows refrigerant to flow from refrigerant supply line 14 into the refrigerating coil embedded in the filter bed of the primary rectification zone. The material between the particles of solid is thus replaced by mother liquor which will be withdrawn from the primary rectification zone in the next shift of process stages whereby the primary rectification zone becomes the filtration zone of the process. Thus, the withdrawal of pure mother liquor from the primary rectification zone at the beginning of the shift in process stages is thereby assured.

At the same time that the reflux quantity of mother liquor enters the top of the primary rectification zone (the second bed from the top of the column as represented in the present description of the diagram), heat transfer fluid flowing upwardly in conduit 34 enters the bottom of the crystal melting zone, by withdrawing at least a portion of the heat transfer fluid from line 34 through line 45 and valve 46 into the coil beginning at the bottom of the crystal melting zone and embedded in the solid particles comprising the filter bed in the crystal melting zone, the heat transfer fluid flowing upwardly through the coil in the latter zone and, after giving up its heat to the contents of the zone, is withdrawn through conduit 47 and valve 48 and discharged into line 40 which conveys the spent heat transfer fluid from the column. The crystals which are deposited between the solid particles in the filter bed of the third downstream zone comprising the crystal melting zone in the process illustrated in FIGURE 1 are there by virtue of the use of this filter bed as the filtration zone in the preceding stage of the cycle when feed stock entered the inlet of this bed during the continuous, cyclic process flow. The heat introduced into the bed of solid particles by the heat transfer fluid melts the crystals at the bottom of the first zone and the resulting molten crystal fluid is withdrawn from the bottom of the zone through conduit 49 through valve 50 in by-pass line 51 which directs the flow of molten crystals around line 1 when valve 50a is closed, into line 49, thereafter flowing through open valve 52 into line 53 which conveys the molten crystals in purified form from the process as one of the primary product streams of the present process, valve 54 in line 49 and valve 55 in line 56, being closed.

Of the molten crystals that are withdrawn from the process flow through line 49, at least a portion thereof is continuously diverted into line 63 by partially closing valve 59 to thereby direct the flow of molten crystals upwardly in line 53, through open valve 60 into line 63 when valves 61, 62 and 58 are closed. The molten crystal product flows through line 63 and through open valve 64, into line 65 which by-passes line 1, through open valve 66 and again into line 63 which conveys the molten crystals into the inlet of the crystal melting zone (conduit 67 between the primary rectification zone and the crystal melting zone) when valve 68 in line 63 is closed.

In accordance with the process of this invention the stream of molten crystals at an elevated temperature, removed from the crystal melting zone through line 49 and recycled through line 53 and line 63 into the top of the crystal melting zone, melts the crystals deposited in this zone during the preceding stage of the cycle. An external heat-exchange unit (not shown) may be incorporated, if desired, into recycle line 53 to raise the temperature of the recycled molten crystals. The purified, molten crystal product is continuously withdrawn in part through valve 59 in line 53, into a product receiver (not illustrated) for storage of the primary product of the present process.

A reflux quantity of the molten crystalline product, at least sufficient to replace the fluid retained in the void spaces between the particles of solid in the filter bed during the course of the instant stage of the process, is simultaneously and continuously allowed to flow through conduit 69 connecting the crystal melting zone with the downstream secondary rectification zone as product is withdrawn through line 53 and as recycle molten crystals is charged into the top of the crystal melting zone. Thus, the stream of molten crystals arriving at the inlet to the line 49 is divided into three continuous streams (each of different flow rates), (1) recycle molten crystals charged into the top of the crystal melting zone, (2) a reflux stream which is allowed to flow downwardly into the subadjacent secondary rectification zone to replace the fluid remaining between the solid particles in the filter bed in this zone, and (3) the product stream removed from the process through line 53 as molten, purified crystallizable component. By thus diverting a portion of the molten crystals into the next adjacent downstream zone as reflux at a rate sufficient to replace the fluid residue from the previous cycle of operation, the fluid removed from the refluxed zone will have the composition of the purified molten product when the next succeeding shift of inlets and outlets makes the secondary rectification zone the crystal melting zone. The effluent stream will have this composition from the initial withdrawal of product from this zone, thereby ensuring the purity of the entire stream of product thus recovered from the process.

The amount of reflux stream thus withdrawn from the crystal melting zone and diverted into the secondary rectification zone is equal at least in quantity to the volume of void spaces between the particles of solid comprising the filter bed and more preferably, is equal to from about 1.3 to about 2.5 times the total volume of the void spaces between the particles of solid in order to provide adequate flushing of residual material from the bed of particles.

As heretofore indicated, during the withdrawal of molten crystalline product from the crystal melting zone through line 49, heat is introduced into the filter bed by means of the heat transfer fluid circulated in the heating coil embedded in the crystal melting zone, the heat transfer fluid entering the coil from line 45, through valve 46 and leaving the coil, after giving up its heat to the mass of solid particles in this zone through line 47 and valve 48.

Since the flow of fluid through the column is continuous, as reflux enters the top of the secondary rectification zone, the reflux stream pushes ahead of it the fluid which was left in this zone, between the particles of solid, at the conclusion of the last cycle of operation, this residual fluid being withdrawn from the bottom of the secondary rectification zone through line 70, valve 71, and recycled by means of pump 72 to the top of the column through line 13. At the instant stage of the operation, this fluid is composed predominantly of mother liquor which was deposited in the void spaces between the particles of solid during the preceding stage of the operation. The material thus removed from the bottom of the secondary rectification zone as feed stock flows into the top of filtration zone is referred to herein as pump-around liquid, the composition of which varies, depending upon which stage of the operation occurs in the lowermost bed of the column during the cycle of operation under consideration. Thus, at the stage of the process illustrated in FIGURE 1, as feed stock enters the filtration zone at the top of the column through line 6, which connects with recycle, pump-around line 13, the mother liquor previously occupying the void spaces between the particles of solid in the secondary rectification zone and being pumped around through line 13 into the top of the column, thus enters the filtration zone in admixture with feed stock flowing into line 13 from line 6.

As the filter bed at the top of the column becomes filled with crystallizable component of the feed stock mixture and after a definite period of time marked by the appearance of crystallizable component in the outlet 33 of the filtration zone, the feed stock entering the process through line 6, is diverted into line 20 by opening valve 21, closing valve 5 in line 1, valve 24 in by-pass line 26 and valve 24a in line 20, thereby directing the flow of feed stock into conduit 33 between the previous filtration and primary rectification zones, also thereby converting the primary rectification zone into the next succeeding filtration zone.

Concomitant with the shift in the feed stock inlet to the separation column, the primary rectification zone is shifted in a downstream direction to the next subadjacent bed which was formerly the crystal melting zone, the latter is shifted to the next subadjacent downstream bed to what was formerly the secondary rectification zone and the latter is shifted to what was previously the filtration zone at the top of the column. Simultaneous with the foregoing shift in the feed stock inlet and product outlets, the flow of refrigerant through line 14 and valve 16 into the uppermost bed in the series is discontinued by closing valve 16. The flow of refrigerant is thereby directed at full rate into the new filtration zone by opening valve 43 in line 44, the refrigerant flowing through the coil embedded in the mass of particles comprising the new filtration bed, removing heat from the fluid therein and flowing out of the coil through valve 73 into line 18, which recycles the spent refrigerant to a compressor or other refrigeration means to remove the heat picked up by the refrigerant in the filtration zone. The feed stock flowing into the top of the filtration zone is thereby cooled and crystals of the crystallizable component of the feed stock are deposited between the particles of solid comprising the filter bed and retained therein for subsequent recovery and removal. At the same time that feed stock is diverted into the second downstream bed in the column, thereby making this bed the new filtration zone, the third downstream bed becomes the primary rectification zone, the fourth downstream bed becomes the crystal melting zone and the first bed in the series, previously the filtration zone, now becomes the secondary rectification zone with all of the functions heretofore described for the previous stage of the cycle. Mother liquor is partly withdrawn from the column through line 63, valves 68, 66 in line 65, 74 in line 75 and valve 62, being thereby discharged into line 28, which conveys the mother liquor from the process flow, as the secondary product of the process. For this purpose, valves 68, 66a, 64 and 74a and valve 30 (in line 28) are closed and valves 31 and 32 are open. At the same time that mother liquor is withdrawn from the process flow, the amount required for reflux is allowed to continue in a downstream direction of flow into the third downstream bed (the new primary rectification zone) to provide the desired reflux function in said zone.

The lowermost bed in the separation column now becomes the crystal melting zone, heat transfer fluid being introduced into this bed from line 34 which connects with line 76 conveying the heat transfer fluid through valve 77 into the bottom of the mass of solid particles holding the crystals previously filtered from the process stream in the preceding stage of the process flow. The stream of molten crystals thereby recovered from the bottom bed of the apparatus is removed through line 70 at a rate controlled by valve 71 and pumped by means of liquid transfer pump 72 through line 13 into the uppermost bed of the column, now the secondary rectification zone. The molten crystalline product thus withdrawn from the lowermost bed in the series is the molten material withdrawn from the previous crystal melting zone as secondary reflux into the top of the present crystal melting zone during the preceding stage of the operation, the stream of molten crystals having thereby replaced the mother liquor occupying the void spaces as a result of the preceding stage of the process. As in the last preceding stage, a certain proportion of the molten crystalline product is recycled to the top of the new crystal melting zone, although another small proportion thereof which serves as secondary reflux into the next downstream bed is allowed to enter into the top bed of the column to replace the feed stock left between the particles of solid during the last preceding filtration stage of the process. A major proportion of purified molten crystals thus recycled to the top of the column is withdrawn through line 6, valve 8 in line 9, and through valve 10 into line 53, through open valves 61 and 60 into line 49 by partially closing valve 59 and opening valves 52 and 50 in by-pass line 51, thereby directing the flow of molten crystalline product into the top of the new crystal melting zone. Valves 7 and 11a in line 6, valves 22 and 25a in line 20, valves 64 and 74a in line 63 and valves 58, 55a, 50a and 54 are closed during this stage of the cycle. The heat transfer fluid introduced into the latter zone through line 76, after giving up its heat to the solid particles maintained in the lowermost bed and melting the crystals deposited there during a preceding cycle of operation when the bed was a filtration zone, is removed from the top of the zone through line 78 and valve 79 and discharged into line 40 for removal from the system for recycle. During the recycle of molten crystalline product in limited quantities to the top of the crystal melting zone, valve 59 is maintained in partially open position, thereby directing the flow of molten crystalline product from the process flow into a product receiver for storage.

The shift in the feed stock and molten crystal inlets to the process and the mother liquor and molten crystalline product outlets from the process are again shifted in a downstream direction after a predetermined period of operation of the preceding cycle when the filter beds in each of the zones become saturated with the components in each of the reflux and product streams. At a point of time determined by the length of the above-indicated stages of the cycle, when all of the inlets and outlets have traversed through the entire length of the column in a downstream direction of flow, the feed stock inlet again arrives at its point of initial inlet, hereinabove described, at the top of the column and the process thereupon has completed one cycle of operation.

Instead of merely one bed for each of the functional zones of the process described in FIGURE 1, the preferred method of operation herein provided is to divide each zone of the process into several beds, preferably at least two beds per zone, each bed having inlets and outlets for the various influent and effluent streams and each bed being connected by a conduit with its subadjacent, downstream bed. Each bed in the zone also contains coils for heating and cooling the fluid streams flowing through the bed and the shift in the inlets and outlets is made in equal simultaneous increments for each of the beds comprising each of the zones, the flow of fluid being continuous and uninterrupted through the serially arranged beds comprising the series of zones. This preferred arrangement is illustrated in FIGURE 2, of the accompanying diagrams, illustrating three beds per zone, the upper zone comprising the crystallization-filtration zone corresponding to FIGURE 1 as the uppermost zone. In this manner, greater control over the feed inlet and product outlet streams is obtained, with the result that the product streams are of greater purity and a greater net recovery of the crystallizable component product is realized.

Referring to FIGURE 2 which illustrates a multiple bed system for each of the functional zones of the process and more specifically, illustrates a multiple bed system for the filtration zone of the process described in FIGURE 1, feed stock enters line 101 through valve 102, flowing upwardly through line 101 and valves 103, 104 and 105 into line 106 and valve 107 into line 108, which discharges the fluid feed stock, together with pump-around fluid, into the top of the uppermost bed in the series of beds comprising the separation column. The crystallizable compound present in the present feed stock as a slurry or in solution is charged, preferably at a temperature of incipient crystallization when it enters the uppermost filter bed A of the filtration zone. At the same time, refrigerant from a suitable source of refrigerant supply enters line 109 and flows into the coil embedded in the filter bed A, the flow of refrigerant being controlled by valve 110. After picking up sufficient heat from the feed stock to cause crystallization of the crystallizable component present in the feed stock, the refrigerant is removed from the bottom of the coil in bed A through line 111 at a rate controlled by valve 112 and is thereafter removed to suitable cooling equipment for recycling as refrigerant supply. The feed stock is cooled as it enters bed A and precipitation of the crystallizable component into the bed of solid particles comprising filter bed A occurs, the filtrate or mother liquor continuing in its downward flow through the bed of particles, precipitating additional crystallizable compound as the solution is further cooled in contact with additional refrigerant coils. The residual mother liquor from which most or all of the crystallizable component has been removed flows in a downstream direction of flow through conduit 113 connecting bed A with downstream bed B into which the feed stock now enters by closing valve 105 and opening valve 114 in line 115 which connects with line 101.

During the period in which feed stock enters bed A through line 108 and flows downwardly through beds A, B and C in a downstream direction of flow, mother liquor from which the desired quantity of crystallizable component has been removed by cooling and filtration of the resulting crystalline precipitate in beds A, B and C is removed from the bottom of the crystallization-filtration zone through line 116, connecting with the conduit outlet 117 of bed C at the bottom of the latter bed which constitutes the terminal bed of the crystallization-filtration zone during this stage of the operation. At least a small portion of the mother liquor, sufficient to reflux into downstream bed D is allowed to continue its flow into the latter subadjacent bed D which constitutes the first bed in the series of three beds comprising the primary rectification zone of the process shown in FIGURE 2. The mother liquor withdrawn through line 116 flows through by-pass line 119 and valve 118 when valve 120 in line 116 is closed, thereafter flowing into line 116, by-pass line 121 and valve 122 when valve 123 is closed, finally flowing again into line 116, through valve 124 into mother liquor discharge line 125, valves 118a and 121a being closed to prevent back-flow in line 116 beyond the junction of the by-pass lines with line 116.

The shift in feed stock inlet from bed A to bed B is necessitated by the accumulation of crystals in bed A and takes place at the point at which the flow of feed stock liquid through bed A is reduced excessively by the accumulation of crystals in the filter bed. At this point valve 110 in line 109 is closed and valve 126 is opened, thereby allowing the flow of refrigerant into the cooling coil in bed B, which preferably is precooled prior to the influx of liquid feed stock therein.

After a sufficient period of cooling bed B and the saturation of bed A with crystalline deposit, feed stock entering the process through line 101 is diverted into line 115 by closing valve 105 and opening valve 114, valves 127 and 128 being closed, forcing the flow of feed stock into connecting conduit 113 between beds A and B and thereafter into the top of bed B. The mother liquor outlet is simultaneously shifted from line 116 (bed C) to the outlet of bed D, not shown, and bed A becomes the last bed in the series of three beds comprising the secondary rectification zone, not illustrated. The feed stock now flows through beds B, C, and D in series, with mother liquor being withdrawn from the bottom of bed D.

It is apparent from the foregoing description that maximum recovery of crystallizable component is realized when refrigerant coils are embedded in each of the beds; however, the process does not necessarily depend for its operation on such provision, it being equally operable if the crystallizable component is precipitated from the feed stock solution outside of the separation column and supplied to the process flow as a slurry of crystals.

The embodiment of this invention illustrated in the accompanying FIGURE 3 is a sectional view of a separation column utilizing a porous screen, filter cloth or paper, a porous metal sheet or other fluid-pervious sheet material as the filter medium utilizable in the process. Suitable porous sheet material for this purpose includes various forms of porous paper and cloth as well as fine mesh screen (the size of the screen openings required being smaller than the size of the crystals formed in the process), porous ceramic filter elements such as perforated porcelain sheets, etc. FIGURE 3 depicts a section of the apparatus utilized in the present process, such as, for example, the filtration zone which may consist of three zones, more or less, as required.

In the embodiment shown in FIGURE 3, the liquid feed stock, preferably as a precooled slurry of crystals, is charged into the filtration zone of the crystal separating column of this invention and allowed to flow upwardly through the superadjacent filter plates in the column. The feed stock enters the column as a slurry in the method illustrated in FIGURE 3, although cooling means may be provided in each zone, as shown in FIGURES 1 and 2 to form crystals of the crystallizable component of the feed stock in situ. The apparatus in this instance is also made up of a vertically disposed housing 201 containing a series of adjacent, generally horizontal trays 202, shown as a perforated supporting grid which divided the column into a series of adjacent compartments. The grid may, for example, be subway grating, coarse wire screen, etc. A series of fluid inlets (or outlets, as the case may be, depending upon the particular stage of the process cycle involved), such as 203 and 204 are located along the vertical length of the column, each inlet being spaced above each of the partitioning grids or trays so as to permit upward flow in each compartment formed by the horizontal trays. The slurry may be charged directly into one of the serially arranged filtration zones without concern for distribution of crystals in the zone, as shown by inlet 203, or, as illustrated by inlet 204, the incoming fluid feed stock may be charged through a suitable distributing device, such as nozzle distributor 205 which provides multiple inlets of the fluid feed stock, diametrically across the width of the column. A filter medium such as a filter cloth or filter paper 206, is placed on the underside of the perforated tray (when the feed stock flows in an upward direction through the column), although a coarse screen or other supporting means 207 may also be placed between the filter medium and the tray, particularly for a relatively thin filter cloth or paper such as 208.

Upward flow of the fluid feed stock is especially preferred when utilizing a thin, sheet material form of filter medium because the crystals tend to maintain a relatively loose arrangement (i.e., the crystals do not pack together) and thus, more readily permit the flow of mother liquor through the bed of accumulated crystals than if a down flow method of charging the feed stock slurry is employed in the process. The flow of fluid into each compartment must necessarily be sufficient to maintain and support the bed of crystals on the underside of each tray against the counter-effect of gravity.

Some of the specific embodiments of this invention are further described in the following example which is intended to provide some of the details with respect to particular charge stocks and methods of operation within the broad scope of the invention. It is not thereby intended, however, to limit the scope of the invention to the variables specifically referred to in the example.

Using an apparatus of the type described in the accompanying diagram a process for separating pure water from sea water is described below, the apparatus consisting of twelve serially-connected beds stacked in a vertical column, each bed being connected to its adjacent bed by a short downcomer conduit from the bed above, the downcomer also having a side-arm nipple connected to a pipe comprising a manifold system of conduits and valves having an arrangement similar to that shown in the accompanying diagrams. The valves are electrically operated solenoid valves controlled by a programming device consisting of a cylindrical keyboard of electrical contacts with complete electrical circuits to the solenoid valves in accordance with a pre-arranged pattern corresponding to the flow pattern in the process. A conduit containing a liquid pump also connects the bottom of the last bed in the series with the top of the first bed in the series. Each bed is packed with approximately 1.3 ft.$^3$ of low density vermiculite particles of approximately ⅛-inch by ⅛-inch and each bed contains separate heating and cooling coils embedded in the vermiculite, the cooling coils being supplied with refrigerant (diethylene glycol cooled to —40° C.) and the heating coils with heat transfer fluid (diethylene glycol at 85° C.) during appropriate stages of the process cycle, as hereinafter described.

Sea water containing 3.5 percent by weight of dissolved salts (98 percent by weight of which are sodium chloride) is supplied as feed stock to recover pure water as the crystallizable component from a salt water concentrate as mother liquor. After aeration, followed by filtration through a bed of charcoal to remove odors and suspended solids, the sea water is cooled to —3° C. and pumped at the latter temperature into the top of the first bed in series which is cooled by the refrigerant (at —40° C.) circulating through the coils embedded in the vermiculite. Upon being cooled further during its passage through the filter bed of vermiculite, crystals of salt-free water precipitate between the particles of vermiculite while a more concentrated brine solution (mother liquor) continues to flow downwardly through the bed.

By means of the above-indicated programming device which operates the switches opening and closing the solenoid valves in the lines leading to and from the beds of vermiculite, the valve in the feed stock supply line connecting with the line to bed No. 1 in the series remains open for 2.5 minutes as brine flows into filter bed No. 1. Simultaneously, the manifold lines leading from the feed stock supply line to beds Nos. 2 to 12 are closed by the programming device. At the same time that refrigerant flows into the cooling coils in bed No. 1, refrigerant also flows into beds 2 and 3 and mother liquor flows from the bottom of bed No. 1 through the conduit into the top of bed No. 2 and from the bottom of bed No. 2 into the top of bed No. 3.

At the same time that the feed stock inlet valve to bed No. 1 is opened, the valve in the manifold line leading from the bottom of bed No. 3 is opened, mother liquor containing 9.45 percent by weight of solids being withdrawn from bed No. 3 into the waste liquor line and out of the process flow. Before the waste liquor is discharged from the process, it is heat exchanged in a tube-and-fin heat exchanger with incoming brine feed stock, cooling the latter from 28° C. to 19° C. prior to refrigeration and discharge into the filtration zone of the column. A portion of the mother liquor reaching the outlet at the bottom of bed No. 3 (12 percent by volume of the total effluent from bed No. 3) is allowed to enter the top of bed No. 4 as primary reflux liquid for the purpose of filling the void spaces between the particles of vermiculite with mother liquor. For this purpose, the programming device controls the flow of effluent from bed No. 3 into the mother liquor withdrawal line. The rate of primary reflux flow is just sufficient to fill the void spaces between the particles of vermiculite in bed No. 4 during the period of time that feed stock enters bed No. 1; that is, for a period of 2.5 minutes.

At the same time that the feed stock inlet valve to bed No. 1 and the mother liquor outlet valve from bed No. 3 are opened, heating fluid at 85° C. is allowed to flow into the heating coils embedded in bed No. 9, melting the ice crystals deposited in the bed of vermiculite during a prior cycle of operation, the melted ice flowing through the conduit connecting beds 9 and 10. The water product thus withdrawn from bed No. 9, containing less than 0.05 percent by weight of dissolved solids, is divided into two streams, one stream representing 15 percent by volume of the total effluent from bed No. 9 is allowed to continue its flow into the top of bed No. 10, the remainder at 25° C. is withdrawn from the downcomer of bed No. 9 into the manifold line connecting with the water product outlet conduit. By means of the programming device, the valve in the outlet conduit is maintained in a partially closed position, directing a portion (15 percent by volume of the total purified water flow) of the purified water flow into a feed line connecting with the downcomer between beds 6 and 7, thereby directing the flow of the warm, purified water into the top of bed No. 7, the warmed water thus melting the water crystals in the upper portion of the bed and forcing the resulting water downwardly through bed No. 7. A portion (15 percent by volume) of the purified water product removed from the bottom of bed No. 9 is permitted to flow through the downcomer connecting the bottom of bed 9 with the top of bed No. 10, into the top of bed 10 as secondary reflux, the indicated rate of flow being sufficient to replace the liquid (mother liquor residue remaining there from the preceding cycle of operation) in the void spaces between the particles of vermiculite with pure water.

During the entire process, the liquid effluent of bed No. 12, removed from the downcomer of the latter bed, is conveyed by means of a pipe connecting the latter downcomer with the top of bed No. 1, the pipe containing a pump which lifts the liquid effluent to the top of the column into bed No. 1. All of the valves in the manifold lines connecting the feed stock supply line with the downcomers between beds 1 and 2, 2 and 3, 3 and 4, 4 and 5, 5 and 6, 6 and 7, 7 and 8, 8 and 9, 9 and 10, 10 and 11 and 11 and 12, are closed during the stage of the process cycle in which feed stock enters the top of bed No. 1.

After 2.5 minutes on stream (during which feed stock is charged into bed No. 1) the valve in the manifold line connecting the feed stock line with the inlet to bed No. 1 is closed and the valve in the manifold line connecting the downcomer between beds 1 and 2 is opened. Simultaneously, refrigerant flowing into bed No. 1 is discontinued and the flow of refrigerant into the coil embedded in bed No. 4 is commenced, while the flow of mother liquor from bed No. 3 is discontinued by closing the valve in the manifold line connecting the downcomer from bed 3; at the same time, the valve in the manifold line connecting the downcomer of bed No. 4 is opened and the stream of mother liquor is allowed to flow into the mother liquor product line, as well as the primary reflux portion thereof into bed No. 5 through the downcomer connecting the bottom of bed No. 4 with the top of bed No. 5.

Heating fluid is charged into bed No. 10 and 15 percent by volume of the purified water (melted water crystals) withdrawn from the downcomer between beds 10 and 11, is charged into the top of bed No. 8 as the source of heat to melt the crystals ahead of the point of withdrawal.

During each succeeding 2.5 minute interval, the inlets and outlets into and from the serially interconnected beds are shifted while at the same time the flows of refrigerant and heating fluid are also shifted in the same manner, the point of charging feed stock after 30 minutes again arriving at the inlet of bed No. 1, one complete cycle of operation having been thereby completed.

The product is purified water substantially free of dissolved sodium chloride (0.05 percent solids) and is produced at a rate of 63 gallons of product per 100 gallons of brine.

In the above process pure water solute is recovered as the crystallizable component of salt water brine, the byproduct being a brine concentrate. Although the water product of the process is substantially pure water, the product, nevertheless, contains a slight contamination of brine (less than 0.05 percent by weight of solids) which is present by virtue of the small quantity of feed stock remaining in the feed lines from the previous use of the lines to convey feed stock to the crystal melting zone in a preceding stage of the process cycle. Even this slight degree of contamination may be eliminated and a substantially pure product formed in the process by flushing the lines last carrying feed stock after each shift in the process stages with a small amount of pure water as purge stock. Thus, when the lines last carrying feed stock are flushed after each shift in the process stages with pure water, in the stage of the process cycle in which molten crystals are recycled to the top of the crystal melting zone, the liquid entering this zone is consistently pure water, not water contaminated with the small amount of feed stock remaining in the lines from a previous stage of the process when the line was used to convey feed stock to the process.

A considerable relief in the complexity of the manifold system of directing the process streams into and out of the process, particularly when separate flush streams are utilized in the process, may be realized by employing a central, multiport valve which directs the process streams in accordance with a pre-arranged pattern, such as the valve and process disclosed in copending application Serial No. 660,790, filed May 22, 1957, for D. B. Broughton et al.

We claim as our invention:

1. A fractional crystallization process for separating a component in substantially pure form from a liquid mixture containing said component which comprises charging said mixture into a filtration zone of a process flow consisting of four serially interconnected zones, including said filtration zone, primary rectification zone downstream adjacent to the filtration zone, a crystal melting zone downstream adjacent to the primary rectification zone and a secondary rectification zone downstream adjacent to the melting zone and having its outlet end in communication with the inlet end of said filtration zone, each of said zones containing a filter medium, cooling said liquid mixture by heat exchange with a coolant and precipitating in said filtration zone crystals of one of the components of said mixture in mother liquor comprising at least one other component of the mixture, withdrawing a portion of the mother liquor stream from an outlet at the downstream end of said filtration zone while simultaneously refluxing a remaining primary reflux portion of said mother liquor stream into the inlet of said primary rectification zone to displace from the filter medium in the last-named zone molten crystals contained therein from a previous cycle of operation, charging a stream of relatively hot molten crystals into the inlet end of the crystal melting zone, withdrawing a stream of molten crystals from an outlet at the downstream end of said crystal melting zone while simultaneously refluxing a secondary reflux portion of the molten crystals into the secondary rectification zone to replace fluid residue contained in the last-named zone from a previous cycle of operation, the flow of said mixture into the filtration zone being discontinued when said filtration zone attains its crystal capacity, and shifting in a downstream direction all inlet and outlet streams into and from said zones an equal increment of the cycle, each cycle of operation being completed upon arrival of the inlet stream of said liquid mixture at the point first contacted by said feed mixture inlet.

2. The process of claim 1 further characterized in that said liquid mixture is a mixture of xylene isomers.

3. The process of claim 1 further characterized in that said liquid mixture is an aqueous salt solution.

4. The process of claim 3 further characterized in that said crystallizable component is water contained in an aqueous salt solution.

5. The process of claim 4 further characterized in that said aqueous salt solution is sea water.

6. The process of claim 1 further characterized in that the volume of mother liquor entering the primary rectification zone during each stage of the process is equal to from 0.5 to about 0.95 times the volume of the void spaces between the particles of filter medium present within the primary rectification zone.

7. The process of claim 1 further characterized in that the volume of molten crystalline product entering the secondary rectification zone during each stage of the process is equal to from 1.1 to about 2.5 times the volume of void spaces between the particles of filter medium in the secondary rectification zone.

8. The process of claim 1 further characterized in that said liquid mixture is cooled by indirect heat exchange with a pre-cooled, non-volatile liquid refrigerant in said filtration zone.

9. The process of claim 1 further characterized in that said liquid mixture is cooled by a liquid refrigerant which vaporizes at the temperature of the incoming mixture and cools said mixture by evaporative cooling, said refrigerant being charged with the liquid mixture into the inlet end of the filtration zone.

10. The process of claim 1 further characterized in that said mixture is precooled prior to entering the filtration zone to a temperature at which the crystallizable component exists in the form of crystals in said mixture.

References Cited in the file of this patent

UNITED STATES PATENTS

| | | |
|---|---|---|
| 2,579,421 | Egan | Dec. 18, 1951 |
| 2,813,851 | McKay | Nov. 19, 1957 |
| 2,905,596 | Findlay | Sept. 22, 1959 |

FOREIGN PATENTS

| | | |
|---|---|---|
| 70,507 | Norway | June 3, 1946 |